United States Patent [19]
Kakimoto

[11] Patent Number: 5,344,252
[45] Date of Patent: Sep. 6, 1994

[54] KEY FOR COUPLING DRIVING AND DRIVEN MEMBERS TOGETHER

[76] Inventor: Hiroshi Kakimoto, 31-8, Akitsu-cho 4-chome, Higashimurayama-shi, Tokyo 189, Japan

[21] Appl. No.: 17,310

[22] Filed: Feb. 12, 1993

[30] Foreign Application Priority Data

Feb. 12, 1992 [JP] Japan .................................. 4-059378
Feb. 24, 1992 [JP] Japan .................................. 4-073506

[51] Int. Cl.$^5$ ........................ F16D 1/00; F16B 19/02
[52] U.S. Cl. .................... 403/358; 403/371; 411/77; 411/55; 411/63; 411/271; 411/354
[58] Field of Search ............... 403/358, 356, 355, 350, 403/371, 370, DIG. 8, 409.1; 411/77, 55, 63, 64, 65, 66, 271, 354

[56] References Cited

U.S. PATENT DOCUMENTS

| | | | |
|---|---|---|---|
| 1,685,098 | 9/1928 | Sklovsky | 403/356 X |
| 2,994,548 | 8/1961 | McGogy | 403/356 |
| 4,033,438 | 7/1977 | Wiltsey | 403/356 X |
| 4,496,259 | 1/1985 | Foucher | 411/63 X |
| 4,579,477 | 4/1986 | Hartman | 403/358 X |

FOREIGN PATENT DOCUMENTS 1495014 12/1977 United Kingdom ................ 403/358

Primary Examiner—Randolph A. Reese
Assistant Examiner—Christopher J. Novosad
Attorney, Agent, or Firm—Sughrue, Mion, Zinn, Macpeak & Seas

[57] ABSTRACT

This key comprises a pair of elongated blocks each having a tapered recess; a tapered pin adapted to be inserted in a tubular tapered portion which is formed by bringing the pair of blocks together in such a manner that the tapered recesses confront, and mutually displaceable in the axial direction; and a clamping member adapted to be screwed into a threaded portion provided on one end of the tapered pin or the tubular tapered portion. The key obtained by assembling these parts can be fitted into a key groove provided between a driving member and a driven member. The clamping member is rotated to mutually displace the tapered pin with respect to the tubular tapered portion in the axial direction, thereby separating the blocks from each other, thus pressing the outer walls of the blocks against the inner wall of the key groove. As a result, the key is firmly fitted into the key groove, and the drive member and the driven member can be securely coupled together with a higher reliability.

13 Claims, 10 Drawing Sheets

KEY FOR COUPLING DRIVING AND DRIVEN MEMBERS TOGETHER

BACKGROUND OF THE INVENTION

1. Field of the Invention

The present invention relates to a key for coupling a driving member and a driven member together, and more particularly, to a key not only capable of being securely fitted into a key groove provided between the driving member and the driven member without damaging the members, but also capable of being easily drawn out from the key groove which receives the key.

2. Description of the Related Arts

Commonly used is a key to couple together a driving member and a driven member, for example, a rotational driving shaft and a rotational driven shaft which is rotated by the driving shaft. More specifically, between the drive and driven members there is provided a tapered key groove which receives a tapered key adapted to be fitted to the key groove. The head of the key is then struck with a hammer or a hydraulically driven tool to drive and fit the key into the key groove for coupling the driving member and the driven member together.

However, the use of such conventional key often damages the driving and driven members due to a shock which may be caused by striking the key with the hammer or the like to fit the key into the key groove. Particularly, in the case where the driving and driven members are optical instruments or precision instruments such as a drive system of a servomotor for use in a precise machine tool and the like, such damage leads directly to a defective products and hence is not allowable.

Moreover, it is difficult in the conventional key to again draw out the key from the key groove once fitting the key into the key groove as described above, and the instruments may be further damaged if the key is forcibly extracted from the key groove.

While on the contrary, in the case where the driving and driven members are the rotational driving shaft and the rotational driven shaft which is rotated following the driving shaft, respectively, there exists a gap, for example, of the order of 0.05 to 0.17 mm at most between the conventional key and the key groove in the width direction (rotational direction). Therefore, every time the rotational driving shaft is reversely rotated, the key is displaced by the distance corresponding to the gap within the key groove in the rotational direction, and undergoes a shock. The frequency of such reversing action may disadvantageously lead to a further enlarged gap. Accordingly, such conventional key is not applicable, in particular, to the precision instruments.

SUMMARY OF THE INVENTION

In order to solve these problems which have been involved in such conventional key, therefore, an object of the present invention is to provide a key capable of coupling a driving member and a driven member together without damaging an instrument.

Another object of the present invention is to provide a kay capable of being easily disengaged from the key groove which receives the key without damaging the instrument.

A further object of the present invention is to provide a key which can be securely fitted into the key groove.

A still further object of the present invention is to provide a key which can be simply and promptly fitted into the key groove and can be easily disengaged from the key groove which receives the key.

A yet still further object of the present invention is to provide a key capable of being fitted into the key groove without creating any gap which may be displaced due to a reversing action of the driving member.

The key according to the present invention capable of accomplishing the above objects is a key adapted to be fitted into a key groove provided between a driving member and a driven member, comprising:

(a) a tapered pin having a circular section and an outer periphery fashioned into a taper surface, the tapered pin including at its one end surface in its longitudinal direction a threaded portion;

(b) a clamping means adapted to be screwed into the threaded portion of said tapered pin; and (c) a pair of elongated blocks each having at its one side surface a tapered recess to be matched with the tapered pin;

the pair of blocks being brought together in such a manner that their respective recesses confront each other, thereby inserting said pair of blocks into said key groove, thus matched tapered recesses define a tubular tapered portion having a non-circular section with a major axis and a minor axis and receiving said tapered pin, the outer periphery of said tapered pin being allowed to be in contact with only the inner periphery of the tubular tapered portion on the side of minor axis when said tapered pin is inserted into said tubular tapered portion;

the clamping means being screwed into the threaded portion provided in said tapered pin so as to relatively axially displace the tapered pin with respect to the tubular tapered portion in the direction where said tapered pin is drawn out from the tubular tapered portion, thereby separating the pair of blocks from each other by virtue of said tapered pin.

These and other objects, features and advantages of the present invention will become more apparent from the following detailed description on the illustratively exemplary preferred embodiments of the present invention when taken in conjunction with the accompanying drawings.

DESCRIPTION OF THE PREFERRED EMBODIMENTS

Figure 1:
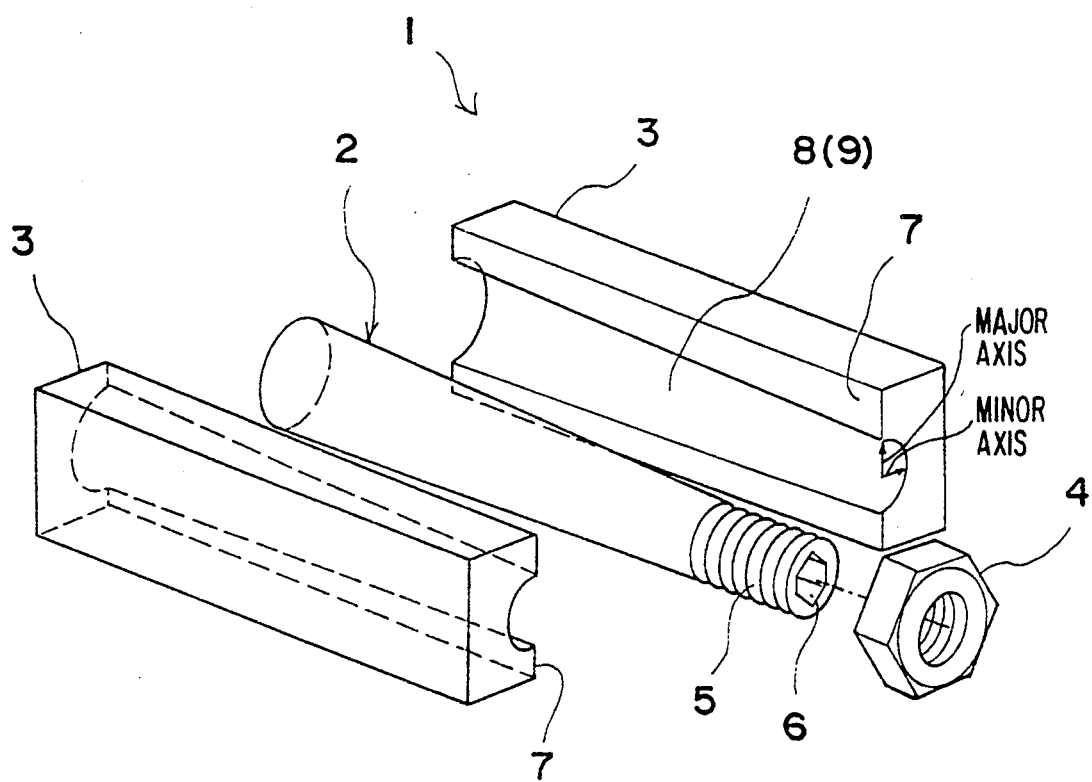
FIG. 1 is an exploded perspective view showing an embodiment of a key in accordance with the present invention.
Figure 8:
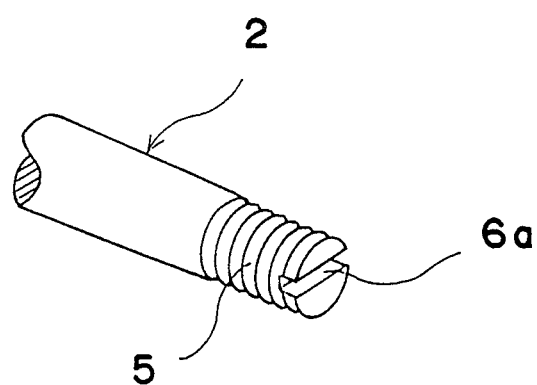
FIG. 8 is a partial perspective view showing another example of a tool hole provided in a tapered pin shown in FIG. 1.

Referring first to FIG. 1, there is shown a key 1 which is an embodiment of the present invention and which comprises a tapered pin 2, a pair of symmetrically elongated blocks 3, and a clamping means 4 such as a nut. The tapered pin 2 has a circular section and its outer periphery is fashioned into an axially inclined taper surface. The tapered pin 2 has at its one end of smaller diameter a threaded portion 5, and a tool hole which is a wrench hole 6 in this embodiment extending axially from one end surface thereof. It is to be noted that the tool hole may be a driving hole 6a as shown in FIG. 8. The tool hole is intended to prevent the tapered pin 2 from rotating along with the clamping means 4 at the time of screwing the clamping means 4. However, this tool hole is not necessarily needed because the above-described rotation of the tapered pin 2 along with the clamping means 4 can be prevented in some degree due to a contact resistance between the tapered pin 2 and the blocks 3.

Each of the pair of blocks 3 is made of an elongated rod having a rectangular section, and includes a flat surface 7 defining its one side surface and having a tapered recess 8. The tapered recess 8 is fitted to the tapered pin 2 and presents a taper angle of inclination substantially identical to that of the tapered pin 2.

When the flat surfaces 7 of the pair of blocks 3 are brought together in such a manner the tapered recesses 8 confront each other, the obtained combination results in a configuration capable of being fitted into a key groove described later. Moreover, a tapered tubular portion 9 is defined by the pair of tapered recesses 8 confronting each other described above.

All of sections along the longitudinal direction of the tapered recess 8 are semicircles each having a circumference slightly smaller than that of a semicircle obtained by halving a complete circle. As a result, sections of the tapered tubular portion 9 formed by bringing the pair of blocks together in such a manner that the tapered recesses 7 confront each other are not complete circles, but ellipses each having a major axis and a minor axis which are defined by bringing together semicircles each having a circumference slightly smaller than that of a semicircle obtained by halving a complete circle.

The tapered pin 2 and the pair of blocks 3 are capable of being formed by cutting, casting, rolling, press molding, or the like. For example, a process of forming the blocks 3 by cutting comprises the steps of:

preparing a pair of blocks each including a semicircular recess having a radius identical to the minimum radius of the tapered recesses 8 to be formed, such blocks capable of being easily formed in the conventional manner such as drawing a steel products;

grinding to smooth flat surfaces of the pair of blocks on the side defining a semicircle;

bringing the smoothed flat surfaces together;

coupling the pair of blocks by means of a chuck of a machine tool so as to press against each other, thereby forming a tubular through-hole extending along the center axis of the pair of blocks;

rotationally inserting a reamer for machining a tapered hole into the tubular through-hole to form a tapered hole, thus formed tapered hole presenting complete circles along the longitudinal direction thereof, the inclination of the taper being, for example, 1/50 which corresponds to the inclination of the reamer for machining a tapered hole available generally on the market;

separating thus machined pair of blocks from each other, each having a tapered recess having a section which is a semicircle obtained by halving a complete circle;

further grinding to a slight degree the flat surface (designated at 7 in FIG. 1) of each of the blocks on the side defining the tapered recess, the level of the grinding is about 0.01 to 0.5 mm, preferably 0.03 to 0.2 mm, and bringing the pair of blocks as described above to form a tapered tubular portion 9 having sections which are slightly out of round due to further grinding and present a major axis and a minor axis.

Figure 2:
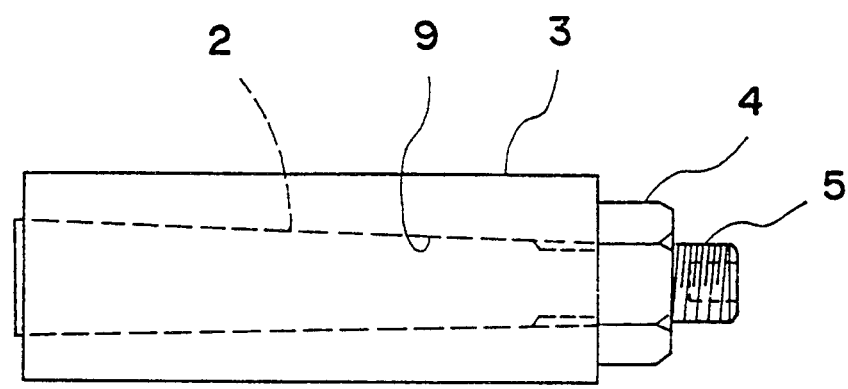
FIG. 2 is a front view showing a combination of the key in FIG. 1.

FIG. 2 illustrates a key 1 assembled by bringing the pair of blocks 3 shown in FIG. 1 together in such a manner the tapered recesses confront each other, inserting the tapered pin 2 into thus configured tubular tapered portion 9, and loosely screwing the clamping means 4 into the threaded portion 5 formed at one end of the tapered pin 2. In this state, sections of the tubular tapered portion 9 are ellipses each having a major axis and a minor axis as described above as compared with the sections of the tapered pin each presenting a complete circle, and hence the outer periphery of the tapered pin 2 is allowed to be in contact with only the inner periphery on the side of the minor axis of the tubular tapered portion 9.

As can be seen in FIG. 2, the diameter of the threaded portion 5 provided at one end of the tapered pin 2 is smaller than the minimum inner diameter of the tubular tapered portion 9 to be formed by the pair of blocks 3, thereby preventing the threaded portion 5 from coming into contact with the inner periphery of the tubular tapered portion 9.

Figure 3:
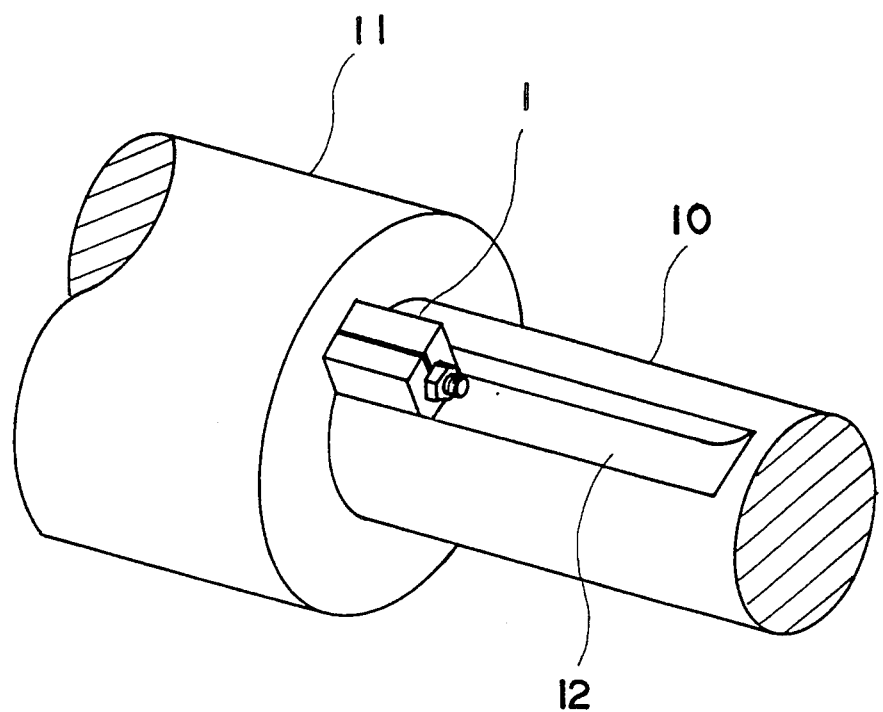
FIG. 3 is a perspective view showing the key in FIG. 1 being inserting into a key groove provided between a driving means and a driven means.

FIG. 3 depicts an elongated key groove 12 having a rectangular section and provided between a driving member 10 and a driven member 11, and the key 1 assembled as shown in FIG. 2 and being fitted into the key groove 12. It is to be appreciated that in case the length of the key 1 is too long with respective to the key groove 12, the key 1 should be cut into a proper length for use.

Figure 4:
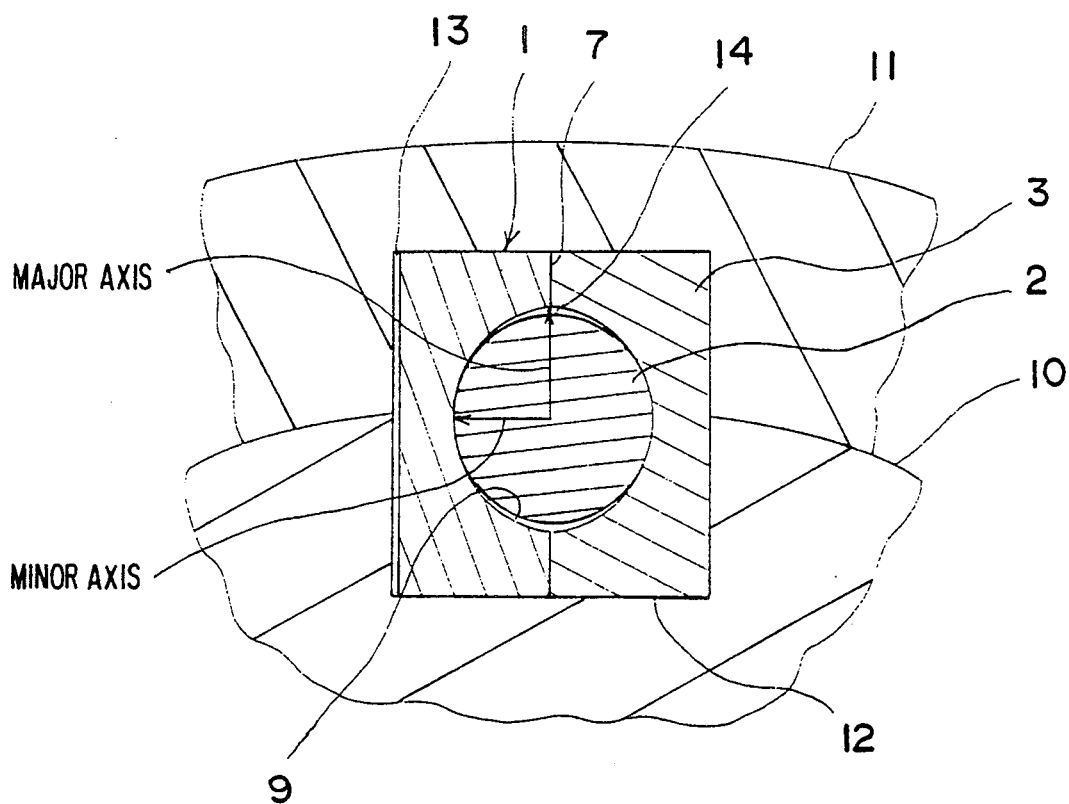
FIG. 4 is an enlarged sectional view showing a state where the key in FIG. 1 is fitted into the key groove provided between the driving means and the driven means.

FIG. 4 is an enlarged sectional view of FIG. 3, in which the flat surfaces 7 of the pair of blocks 3 are combined in close contact with each other for the insertion into the key groove 12. Between the outer surface of thus combined pair of blocks 3 and the inner surface of the key groove 12, there is formed a gap 13 whose width is about 0.01 to 0.03 mm, for example. The key 1 can be easily inserted into the key groove 12 by virtue of presence of the gap 13.

On the other hand, the tapered pin having a completely circular section is allowed to be in contact with only the inner periphery (right and left sides of the figure) at the side of the minor axis of the tubular tapered portion 9 having sections with major axes and minor axes, while along the inner periphery (top and bottom sides int he figure) there is formed a non-contacting zone 14 which preferably extends of the order of 10% of the entire circumference of the tapered pin 2, for example.

Figure 5:
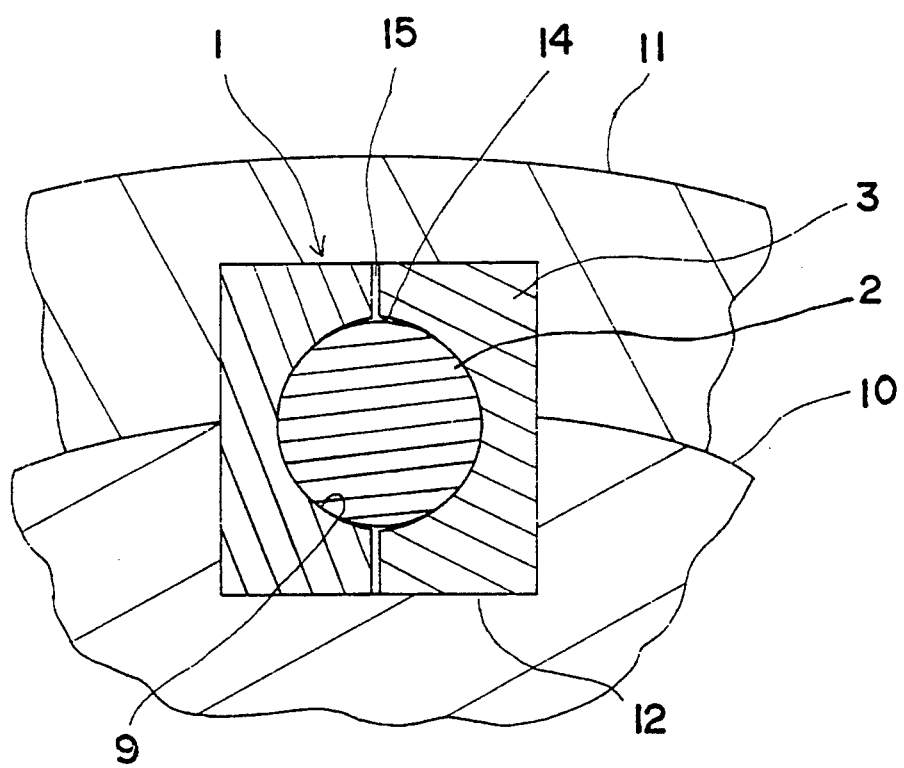
FIG. 5 is an enlarged sectional view showing another state where the key in FIG. 1 is fitted into the key groove provided between the driving means and the driven means.

FIG. 5 shows a state where the key is fitted into the key groove 12 by clamping the tapered pin 2 by means of the clamping means from the state of FIG. 4, and displacing the tapered pin 2 relative to the tubular tapered portion 9 in the axial direction, thereby pulling out the tapered pin. Such clamping can be effected by rotating the clamping means 4 using a wrench or the like after the insertion of the tip of the wrench into the wrench hole 6 (refer to FIG. 1) provided on the end surface of the tapered pin 2 to prevent the accompanying rotation of the tapered pin.

As can be seen in FIG. 5, the above-described relative movement of the tapered pin 2 in the axial direction baises laterally the inner periphery of the tubular tapered portion 9 on the side of the minor axis, and hence the pair of blocks 3 are laterally separated to cause a slit-like gap 15 between the two flat surfaces, while the top and bottom non-contacting portions 14 are decreased in width as compared with the state shown in FIG. 4. Further more, the gap 13 which existed in the state of FIG. 4 can not be seen in FIG. 5, and hence, the right and left outer surfaces of the pair of blocks 3 are firmly presses against the inner surface of the key groove 12, whereby the key 1 is fitted into the key groove without any disengagement. Thus, the driving member 10 and the driven member 11 is firmly coupled together.

According to experiments, the amount by which the clamping means 4 rotates from the state when in FIG. 4 to that shown in FIG. 5 is of the order of 0.5 to 2 turns in the case where module of the threaded portion is 1. Providing that the difference between the major axis and the minor axis of the tubular tapered portion 9 is of the order of 0.1 mm, the width of the slit-like gap 15 is nearly invisible to the naked eye.

In order to restore the state shown in FIG. 4, that is, the state in which the key 1 can be pulled out from the key groove 12 from the state shown in FIG. 5, that is, the state in which the key 1 is firmly fitted into the key groove, the tip of the wrench may be inserted into the wrench hole 6 provided at the end of the tapered pin to rotate only the wrench while keeping the nut acting as the clamping means 4 from rotating with the aid of the wrench. Thus, the tapered pin 2 is displaced in the direction where the taper is enlarged and can be disengaged from the block 3.

Figure 6:
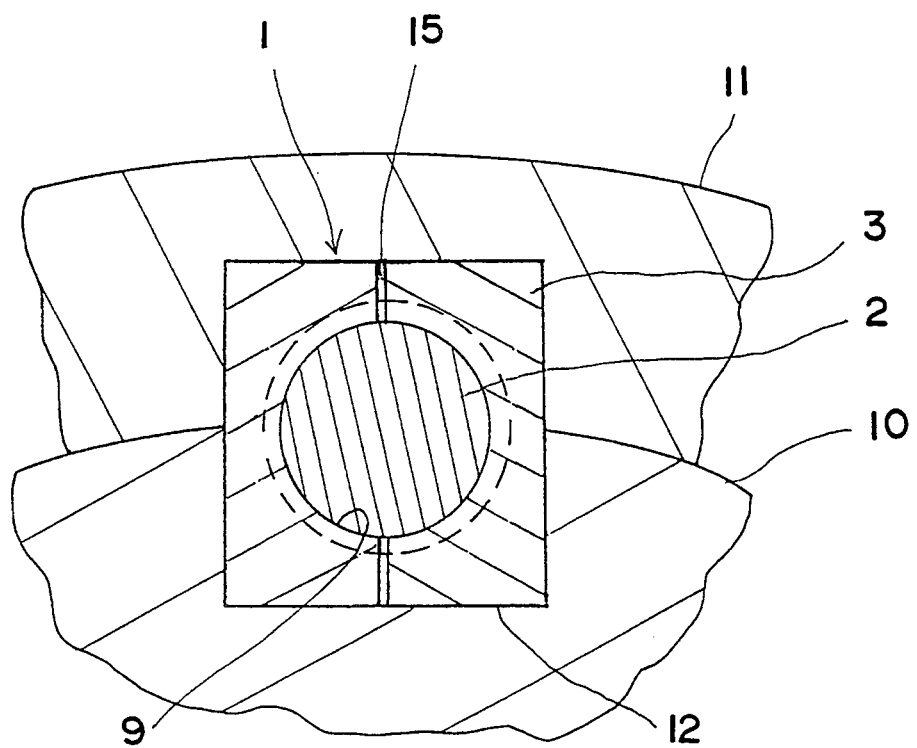
FIG. 6 is an enlarged sectional view showing a further state where the key in FIG. 1 is fitted into the key groove provided between the driving means and the driven means.

FIG. 6 illustrates the key 1 being fitted into the key groove 12 in the case where the gap formed between the combined pair of blocks 3 and the key groove 12 is relatively large when the key 1 is inserted into the key groove 12. In this case, the outer periphery of the tapered pin 2 is in entire contact with the inner periphery of the tubular tapered portion 9, and hence the top and bottom non-contacting portions 14 which existed in FIG. 5 are not to be seen in FIG. 6. On the contrary, the width of the slit-like gap 15 between the two blocks 3 becomes large.

Figure 7:
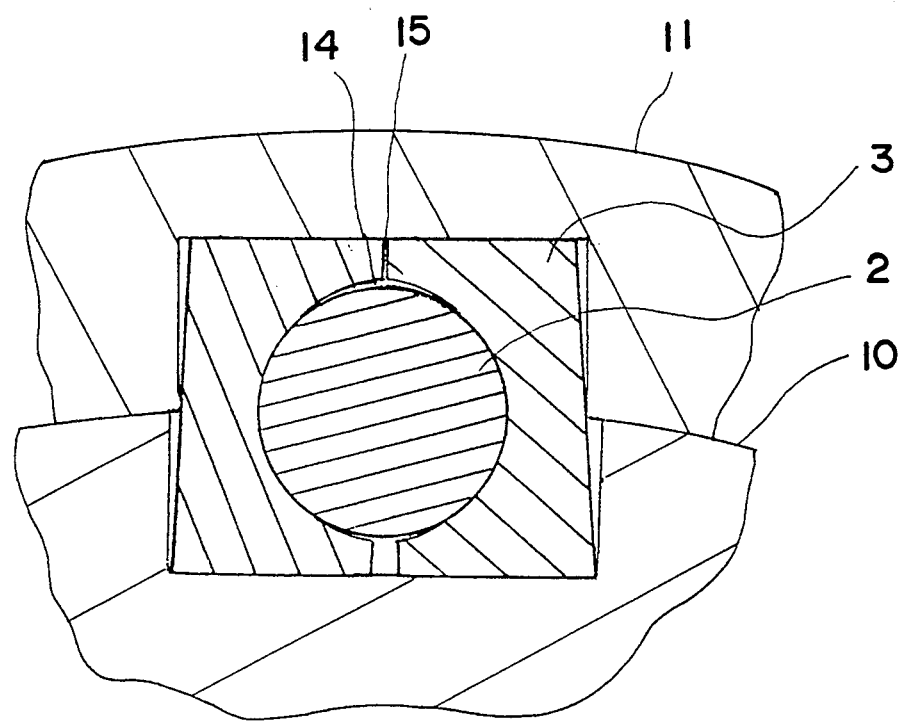
FIG. 7 is an enlarged sectional view showing a still further state where the key in FIG. 1 is fitted into the key groove provided between the driving means and the driven means.

FIG. 7 depicts the key 1 being fitted into the key groove 12 in the case where there exists a tolerance between the width of the key groove of the driving member 10 and the width of the key groove of the driven member 11. In this case, since the width of the key groove of the driving member 10 is larger than that of the kay groove of the driven member 11, the part of each of the blocks being in contact with the key groove is not allowed to enlarge when the tapered pin 2 is clamped by the clamping means. As a result, the sections of the pair of blocks 3 are slightly enlarged into a trapezoid in configuration as shown in the figure. However, such tolerance between the two key grooves is usually extremely small, and hence there is no problem for practical use. It is to be appreciated that the above-described trapezoid is somewhat adjusted to be close to a rectangular due to a slight deformation of the blocks 3 and the key groove of the driven member 11 providing the clamping of the tapered pin is strengthened, in other words, the relative movement of the tapered pin in the axial direction is enlarged.

Figure 9:
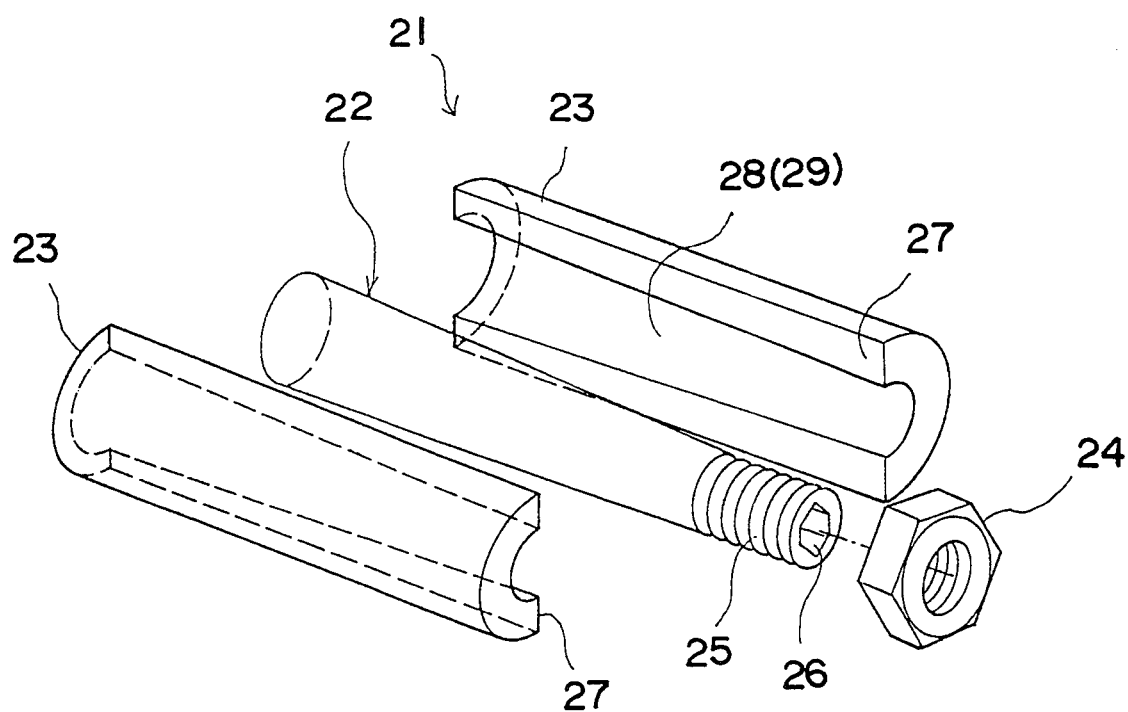
FIG. 9 is an exploded perspective view showing another embodiment of the key in accordance with the present invention.

FIG. 9 is an exploded perspective view showing another embodiment of the key according to the present invention which is the same as FIG. 1 except that the circumference of the sections are a circle having the same radius. In other words, this key is designed to be fitted into the key groove having a circular inner periphery.

Referring to FIG. 9, a key 21 comprises a tapered pin 22, a pair of symmetrically elongated blocks 23, and a clamping means 24 such as a nut. The tapered pin 22 has a circular section and the outer periphery fashioned into a taper surface. The tapered pin 22 has at one end on the side of smaller diameter a threaded portion 25 and a wrench hole 26 extending axially from its end surface and serving as a tool hole capable of receiving the tip of the clamping tool. The pair of blocks 23 are each made of an elongated rod having a semicircular section and each include a flat surface 27 defining its one side surface having a tapered recess 28 adapted to be mated with the tapered pin 22.

The pair of blocks 23 are combined in such a manner their respective flat surfaces are brought together, thereby obtaining a configuration capable of being matched with the key groove and forming a tubular tapered portion 29 by the cooperation of the pair of tapered recesses 28 which confront each other.

The section of this tubular tapered portion 29 is also in the form of a semicircle having a circumference slightly shorter than that of a semicircle obtained by halving a complete circle. In addition, the sectional outer peripheries of the pair of blocks 23 are each a semicircle having a circumference slightly shorter than that of a semicircle obtained by halving a complete circle. Accordingly, the section of the tubular tapered portion 29 is not a complete circle, but an ellipse having a major axis and a minor axis which is formed by combining the two semicircle each having a circumference shorter than that of a semicircle obtained by halving the complete circle.

Figure 10:
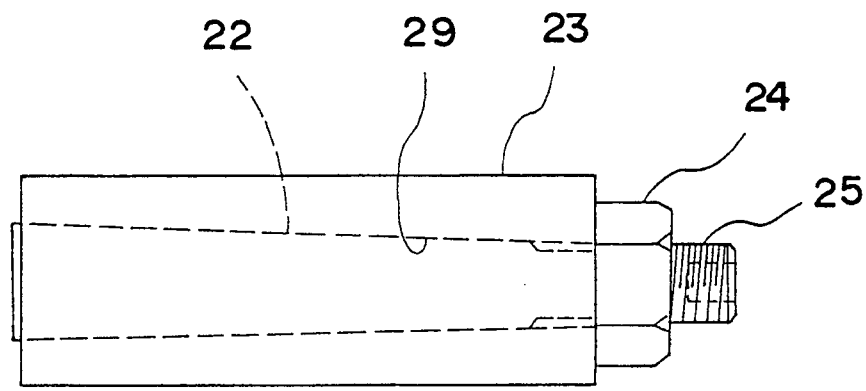
FIG. 10 is a front view showing the assembled state of the key shown in FIG. 9.

FIG. 10 illustrates a state where the pair of blocks 23 shown in FIG. 9 are brought together in such a manner their respective tapered recesses confront each other to define the tubular tapered portion 29, the tapered pin 22 is inserted into thus formed tubular tapered portion 29, and the clamping means 24 is loosely screwed to the threaded portion 25 provided on the one end of the tapered pin 22.

Figure 11:
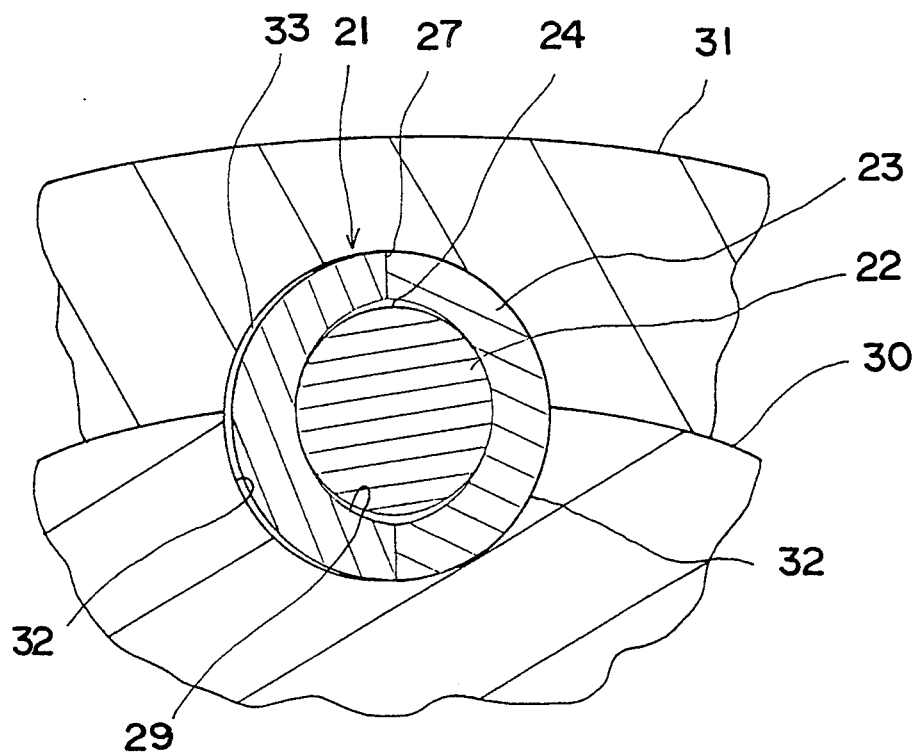
FIG. 11 is an enlarged sectional view showing a state a key in FIG. 9 is fitted into a key groove provided between the driving means and the driven means.

FIG. 11 is an enlarged sectional view showing the key 21 being in the state of FIG. 10 and fitted into the key groove 32. Referring to FIG. 11, the combination of the pair of blocks 23 whose flat surfaces 27 are brought into intimate contact with each other is being inserted into the key groove 32 having a circular section and provided between a driving member 30 and a driven member 31. In this state, there is formed an arcuate gap 33 between the pair of blocks 23 and the key groove 32.

On the other hand, the tapered pin is allowed to be brought into contact with only the inner periphery of the tubular tapered portion 29 on the side of the minor axis (right and left side in the figure), thus creating a non-contacting portion 24 at the inner periphery of the tubular tapered portion 29 on the side of the major axis (top and bottom side in the figure).

Figure 12:
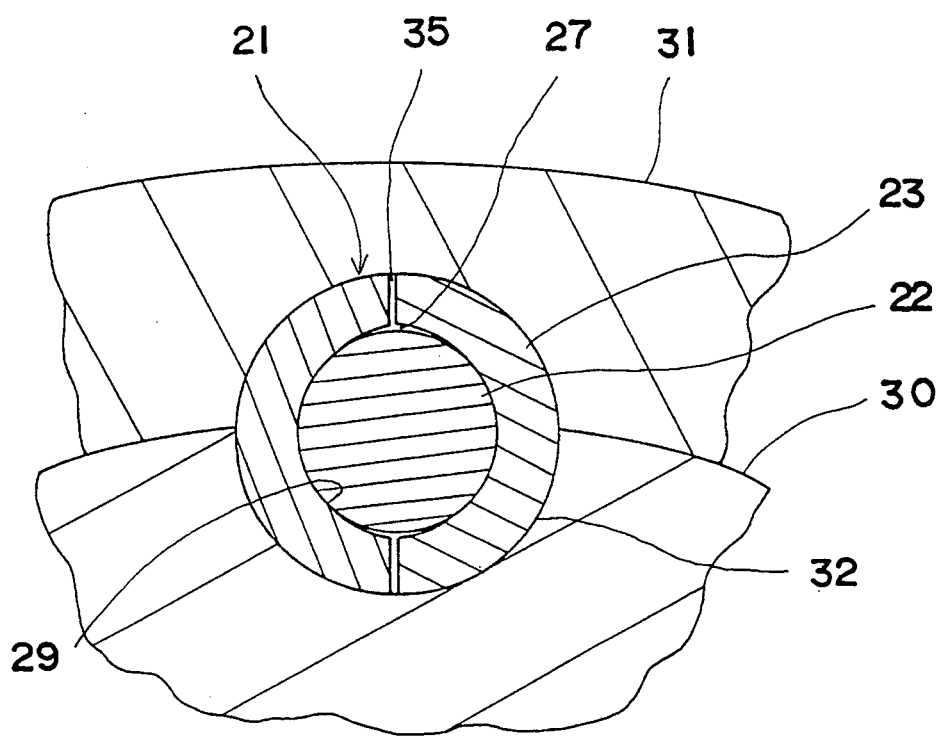
FIG. 12 is an enlarged sectional view showing another state a key in FIG. 9 is fitted into a key groove provided between the driving means and the driven means.

FIG. 12 illustrates a state where the tapered pin 22 being in the state of FIG. 11 is clamped with the aid of the clamping means to displace the tapered pin 22 in the axial direction relative to the tubular tapered portion 29, and the key is firmly fitted into the key groove 32.

In the state shown in FIG. 12, the inner periphery of the tubular tapered portion 29 on the side of the minor axis is laterally forced by the tapered pin 22 to laterally separate the pair of blocks 23, thus creating a slit-like gap 35 between the two flat surfaces and decreasing the top and bottom non-contacting zones 34. As a result, the gap 13 which existed in the state shown in FIG. 11 is not to be seen in FIG. 12, and the outer periphery of the pair of blocks 23 are firmly pressed against the key groove 32, thereby preventing the disengagement of the key 21 from the kay groove 32.

In the above embodiment, the tapered recesses of the blocks are each fashioned to have semicircular sections each having a circumference slightly shorter than that of a semicircular obtained by halving a complete circle. As a valiant of the tapered recess, there can be used one having functions similar to those of such semicircular. For example, there may be employed a tapered recess having a semielliptical section slightly offset from a semicircle. The difference between the major axis and the minor axis of a tubular tapered portion which is defined by the combination of the blocks each having a tapered recess with such semielliptical section is of the order of 0.01 to 0.5 mm, preferably about 0.02 to 0.2 mm.

The key according to the present invention can be easily inserted into the key groove with the combination of the pair of blocks, the tapered pin and the clamping means. Moreover, the clamping means is rotated to mutually displace the tapered pin in the axial direction so as to extract the tapered pin from the combined pair of blocks, thereby separating the pair of blocks from each other to press its outer wall against the inner wall of the kay groove. Thus, the key is firmly fitted into the key groove to securely couple the driving member and the driven member by virtue of the key with a higher reliability.

While on the contrary, when the key is required to be disengaged from the key groove, the clamping means is rotated oppositely to the foregoing so as to forcible displace the tapered pin into the combined pair of blocks.

According to the key of the present invention, in this manner, the key is not driven into the key groove by striking, and hence the drive member and the driven member are not subjected to a damage arising from an impact. Furthermore, since there is no gap between the key and the key groove in the width direction (rotational direction), the key is not subjected to the impact irrespective of a repetitive reversal of the driving member.

The key in accordance with the present invention presents the above-described effect, and hence is suitable for coupling the driving member and the driven member of, in particular, a precision instrument.

Figure 13:
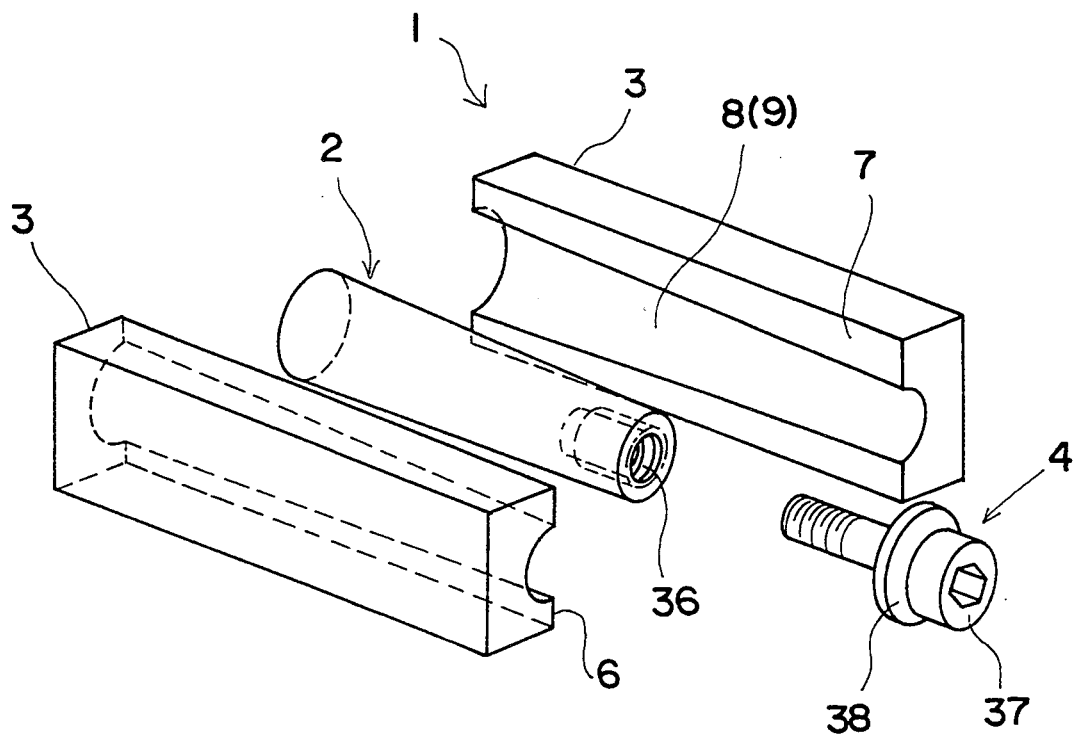
FIG. 13 is an exploded perspective view showing a further embodiment of a key in accordance with the present invention.

FIG. 13 is an exploded perspective view showing a further embodiment of the key according to the present invention in the same manner as in FIG. 1. Referring to FIG. 13, there is shown a tapered pin 2 having less than that of the pair of blocks. That is, the smaller diameter end portion of the tapered pin shown in FIG. 1 is cut off. Moreover, as a clamping means there is formed a threaded hole 36 on the smaller diameter end surface of the tapered pin 2, into which male threaded bolt 37 with a washer 38 is screwed. The bolt 36 is the same as that shown in FIG. 1 except that the bolt 36 has as its end surface a hexagonal wrench hole.

Figure 14:
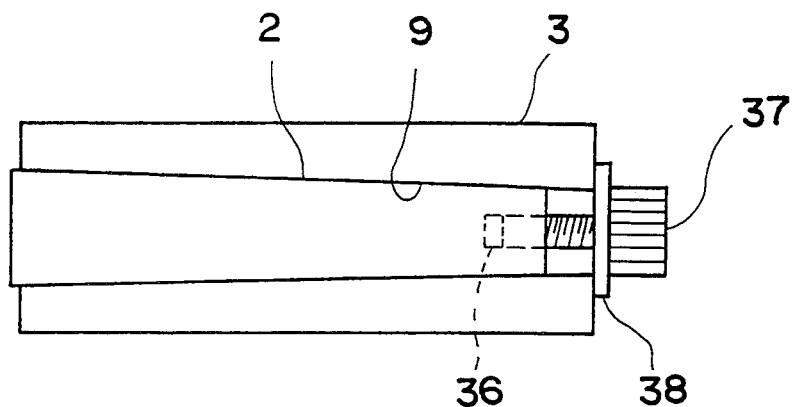
FIG. 14 is a front view showing the assembled state of the key shown in FIG. 13.

The key in FIG. 13 is assembled as shown in FIG. 14, and fitted into the key groove of the driving member and the key groove of the driven member. The threaded end of the bolt 37 with the hexagonal wrench hole is screwed into the bolt hole 36 of the tapered pin 2, and the tip of a hexagonal wrench is fitted into the hexagonal hole provided on the head end surface of the bolt 36. Then the rotation of the wrench permits the tapered pin 2 to displace toward the smaller diameter portion, thereby fixedly securing the key to the key groove. This key is applicable to a case where the entirety of the key is accommodated within the key groove, and the end of the key is not exposed to the outside.

Figure 15:
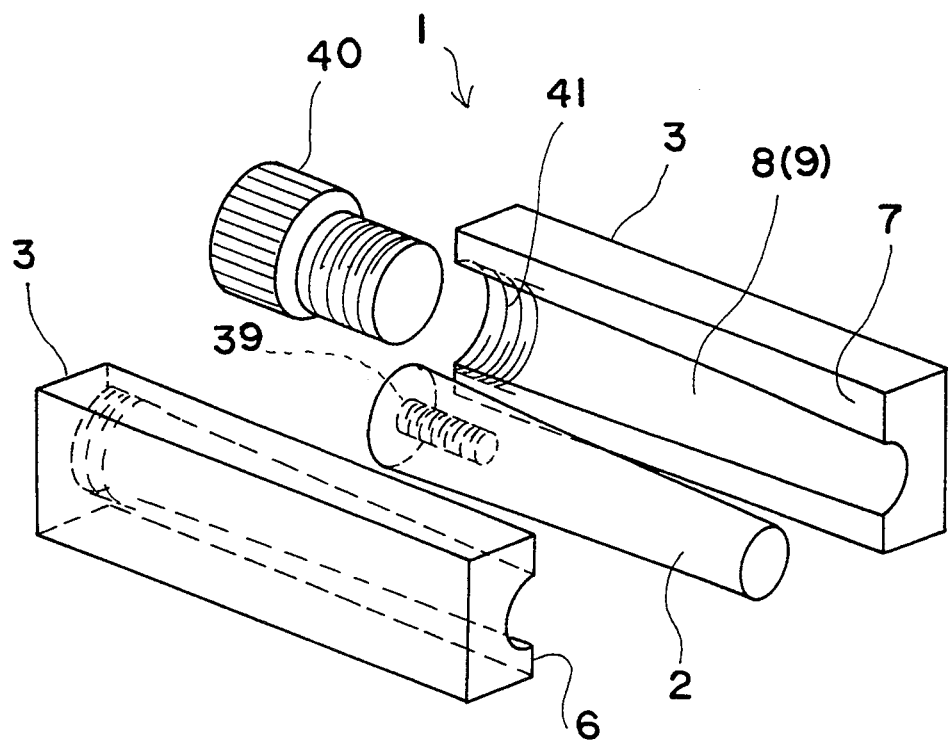
FIG. 15 is an exploded perspective view showing a still further embodiment of a key in accordance with the present invention.

FIG. 15 depicts a still further embodiment of the key according to the present invention in the same manner as FIG. 1. This embodiment differs from the embodiment illustrated in FIG. 1 in that the entire length of the tapered pin is shorter than that of the blocks as if the larger diameter portion of the tapered pin 2 is cut off with respect to the blocks 3, and in that as a clamping means there is a bolt hole 41 exhibiting no taper in the tapered hole and formed on the larger diameter side, into which a threaded bolt 40 with a hexagonal wrench hole, and in that the tapered pin 2 has at its larger diameter end surface a bolt 39 for the disengagement of the key.

Figure 16:
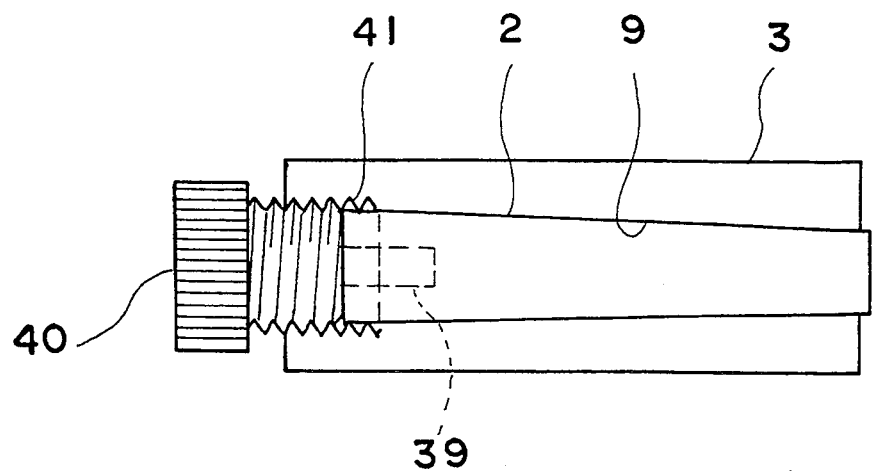
FIG. 16 is a front view showing the key in FIG. 15 which has been assembled.

In order to fasten this key between the key groove of the driving member and the key groove of the driven member, the pair of blocks 3 and the tapered pin 2 are combined as shown in FIG. 16 and inserted into the key grooves. Then the bolt 40 with the hexagonal wrench hole is screwed into the key groove so as to press down the larger diameter end surface of the tapered pin 2 by the bolt end surface, thereby displacing the tapered pin 2 into the smaller diameter portion.

Figure 17:
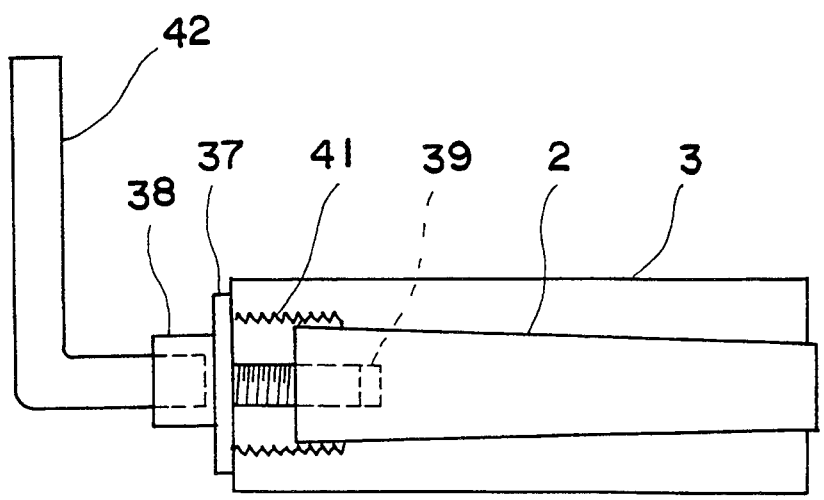
FIG. 17 is an explanatory drawings for disengaging the key after the insertion of the key in FIG. 16 into the key groove provided between the driving member and the driven member.

FIG. 17 is an explanatory view for disengaging the key from the key groove after the engagement of the key with the key groove as shown in FIG. 16. To this end, the bolt 40 with a hexagonal wrench hole shown in FIG. 16 is removed, and the threaded portion of another bolt 38 with a hexagonal wrench hole is attached to the bolt hole 39 of the tapered pin 2 through the washer 37, and then the wrench 42 is rotated in the clamping direction to displace the tapered pin to the larger diameter side, thereby finally drawing it out from the blocks 3.

Although the present invention has been described in connection with certain preferred embodiments, it should be clear that various changes and modifications can be made without departing from the sprit and scope of the claimed invention.

What is claimed is:

1. A key adapted to be fitted into a key groove provided between a driving member and a driven member, comprising:
   (a) a tapered pin having a circular cross-section and an outer periphery fashioned into a taper surface, said tapered pin including at its one end surface in its longitudinal direction a threaded portion;
   (b) a clamping means adapted to be screwed to said threaded portion of said tapered pin; and
   (c) a pair of elongated blocks each having at its one side surface a tapered recess to be matched with said tapered pin;
   said pair of blocks being brought together in such a manner that their respective recesses confront each other, thereby inserting said pair of blocks into said key groove,
   thus matched tapered recesses define a tubular tapered portion having a non-circular cross-section with a major axis and a minor axis and receiving said tapered pin,
   the outer periphery of said tapered pin being allowed to be in contact with only the inner periphery of said tubular tapered portion on the side of minor axis when said tapered pin is inserted into said tubular tapered portion;
   said clamping means being screwed to said threaded portion provided in said tapered pin so as to relatively axially displace said tapered pin with respect to said tubular tapered portion in the direction where said tapered pin is drawn out from said tubular tapered portion, thereby separating said pair of blocks from each other by virtue of said tapered pin.

2. A key according to claim 1, wherein said tapered recesses of said pair of blocks include semicircular cross-sections each having a circumference slightly shorter than that of a semicircle obtained by halving a complete circle.

3. A key according to claim 2, wherein said tapered recess is obtained by grinding a flat surface including a tapered recess having a cross-section of a semicircle obtained by halving a complete circle.

4. A key according to claim 3, wherein the level of grinding of said flat surface is of the order to 0.01 to 0.5 mm.

5. A key according to claim 1, wherein said tapered recesses of said pair of blocks each have a semielliptical cross-section.

6. A key according to claim 1, wherein said pair of blocks present a rectangular outer periphery and a section in cooperation when they are brought together in such a manner their respective tapered recesses confront, thereby allowing the insertion into a rectangular in cross-section key groove.

7. A key according to claim 1, wherein said pair of blocks present a circular outer periphery and a section in cooperation when they are brought together in such a manner their respective tapered recesses confront, thereby allowing the insertion into a circular in cross-section key groove.

8. A key according to claim 1, wherein said tapered pin includes an insertion hole for a clamping tool axially extending from the center of the end surface having said threaded portion of said tapered pin.

9. A key according to claim 1, wherein said threaded portion of said tapered pin has a smaller outer diameter than the minimum inner diameter of said tubular tapered portion.

10. A key according to claim 1, wherein said driving member and said driven member comprise a rotational driving member and a rotational driven member, respectively.

11. A key according to claim 1, wherein said driving member and said driven member make up a precision instrument.

12. A key adapted to be fitted into a key groove provided between a driving member and a driven member, comprising:
   (a) a tapered pin having a circular cross-section and an outer periphery fashioned into a taper surface, said tapered pin including a threaded portion at its one end surface on the side of reduced section in its longitudinal direction;
   (b) a clamping means adapted to be screwed into said threaded portion of said tapered pin; and
   (c) a pair of elongated blocks each having at its one side surface a tapered recess to be matched with said tapered pin;
   said pair of blocks being brought together in such a manner that their respective recesses confront each other, thereby allowing said pair of blocks to be inserted into said key groove,
   thus matched tapered recesses define a tubular tapered portion having a non-circular cross-section with a major axis and a minor axis and receiving said tapered pin,
   the outer periphery of said tapered pin being allowed to be in contact with only the inner periphery of said tubular tapered portion on the side of said minor axis when said tapered pin is inserted into said tubular tapered portion;
   said clamping means being screwed into said threaded portion provided in said tapered pin so as to axially relatively displace said tapered pin with respect to said tubular tapered portion in the direction where said tapered pin is drawn out from said tubular tapered portion, thereby separating said pair of blocks from each other by virtue of said tapered pin.

13. A key adapted to be fitted into a key groove provided between a driving member and a driven member, comprising:

(a) a tapered pin having a circular cross-section and an outer periphery fashioned into a taper surface;

(b) a pair of elongated blocks each having at its one side surface a tapered recess to be matched with said tapered pin and having a threaded portion at its one end on the side of enlarged tapered recess in the longitudinal direction;

(c) a clamping means adapted to be screwed into said threaded portion of said tapered recess; and said pair of blocks being brought together in such a manner that their respective recesses confront each other, thereby allowing said pair of blocks to be inserted into said key groove, thus matched tapered recesses define a tubular tapered portion having a non-circular cross-section with a major axis and a minor axis and receiving said tapered pin, the outer periphery of said tapered pin being allowed to be in contact with only the inner periphery of said tubular tapered portion on the side of said minor axis when said tapered pin is inserted into said tubular tapered portion;

said clamping means being screwed into said threaded portion provided in said tapered recess so as to axially relatively displace said tapered pin with respect to said tubular tapered portion in the direction where said tapered pin is drawn out from said tubular tapered portion, thereby separating said pair of blocks from each other by virtue of said tapered pin.

* * * * *